(12) United States Patent
Nemoto et al.

(10) Patent No.: US 6,804,061 B2
(45) Date of Patent: Oct. 12, 2004

(54) RESIN ERECTING LENS ARRAY AND METHOD FOR FABRICATING THE SAME

(75) Inventors: Hiroyuki Nemoto, Osaka (JP); Yoshiyuki Uemura, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 64 days.

(21) Appl. No.: 10/138,112

(22) Filed: May 2, 2002

(65) Prior Publication Data

US 2002/0176172 A1 Nov. 28, 2002

(30) Foreign Application Priority Data

May 9, 2001 (JP) .......................................... 2001-138965
Nov. 1, 2001 (JP) .......................................... 2001-336711
Mar. 13, 2002 (JP) .......................................... 2002-068031

(51) Int. Cl.[7] .......................... G03B 21/60; G02B 27/10
(52) U.S. Cl. ........................................ 359/622; 359/455
(58) Field of Search ................................. 359/618, 619, 359/221, 622, 626, 811, 819, 455; 353/32

(56) References Cited

U.S. PATENT DOCUMENTS 3,950,769 A * 4/1976 Yevick ........................ 396/327
6,363,603 B1 * 4/2002 Nemoto et al. ................ 29/458
6,462,794 B1 * 10/2002 Yoshikawa et al. ........... 349/95

* cited by examiner

*Primary Examiner*—Georgia Epps
*Assistant Examiner*—William Choi
(74) *Attorney, Agent, or Firm*—RatnerPrestia

(57) ABSTRACT

A resin erecting lens array is fabricated by forming a coating of silicon dioxide compound on the surface of each of molded resin lens plates, forming an aperture stop for each micro-lens on the surface of each resin lens plate, applying an adhesive on end portions of each resin lens plate, spreading out the adhesive into the space between the resin lens plates being placed on top of one another, aligning an optical axis of each micro-lens on the resin lens plates, inserting heat-melting resin pins into the pin-insert holes of the resin lens plate, and melting at least one end of each resin pin to secure the resin lens plates together.

24 Claims, 12 Drawing Sheets

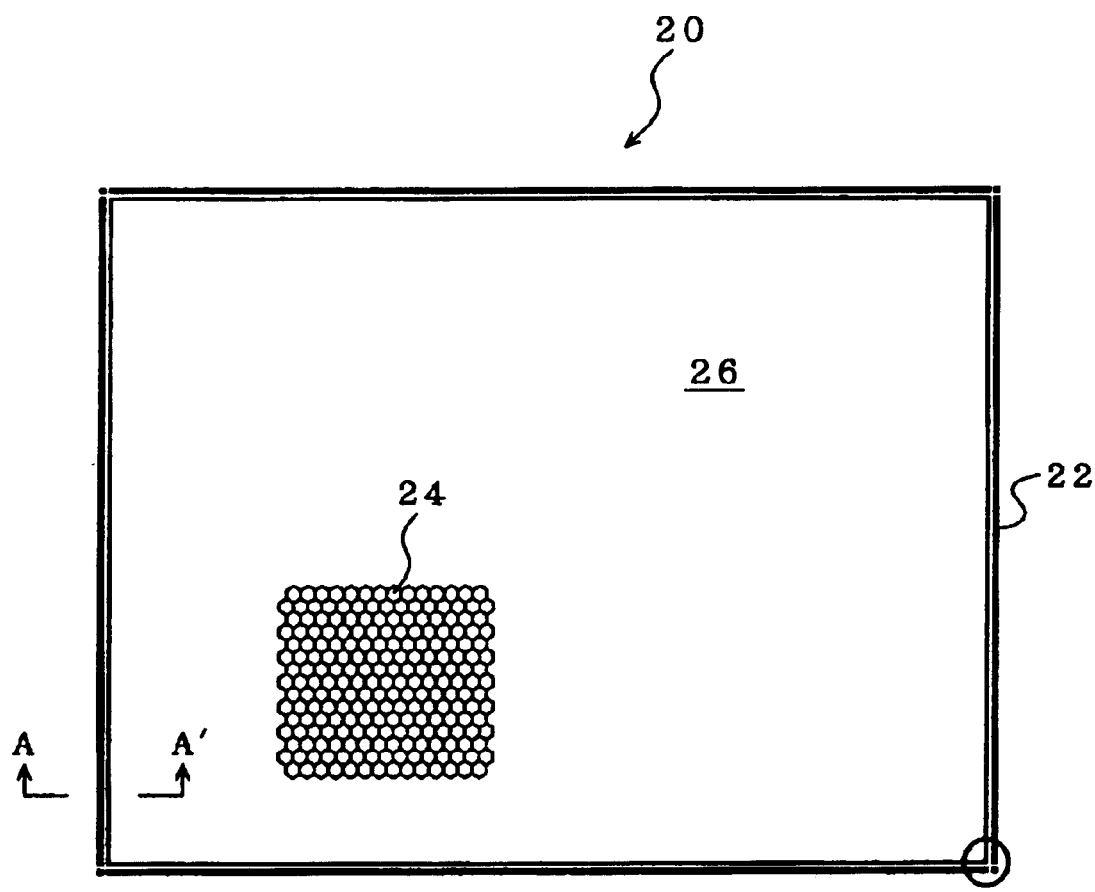
F I G. 4 A
F I G. 4 B

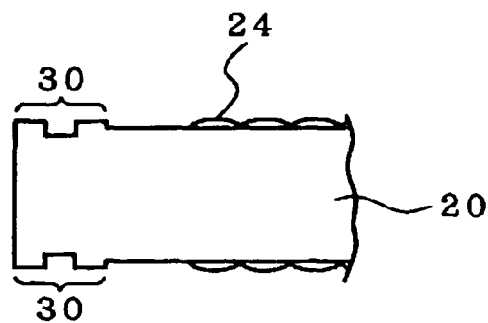
F I G. 6
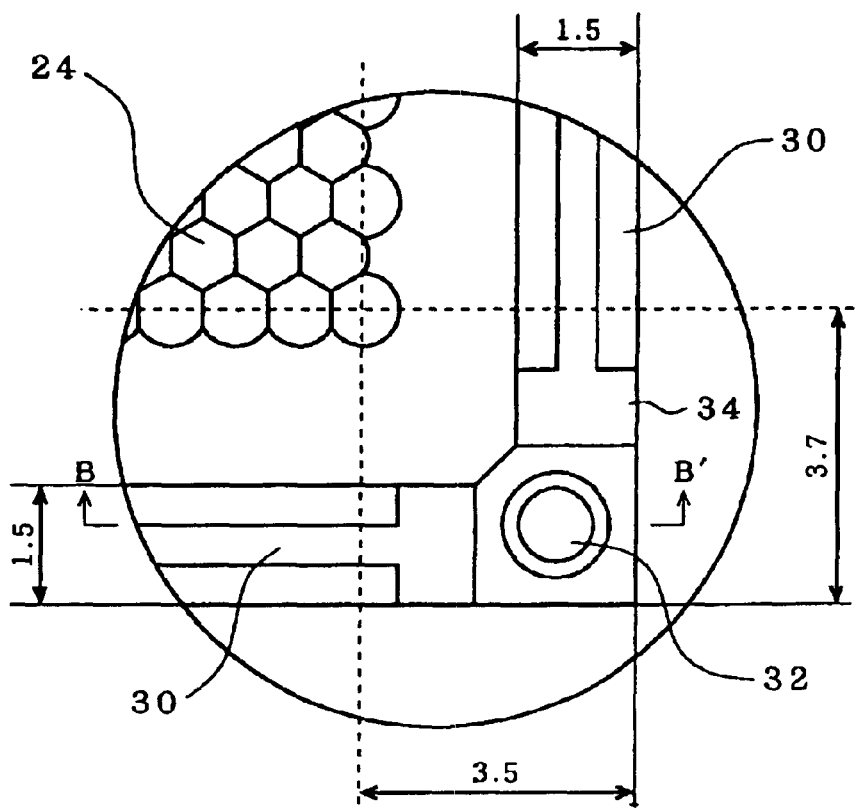
F I G. 7

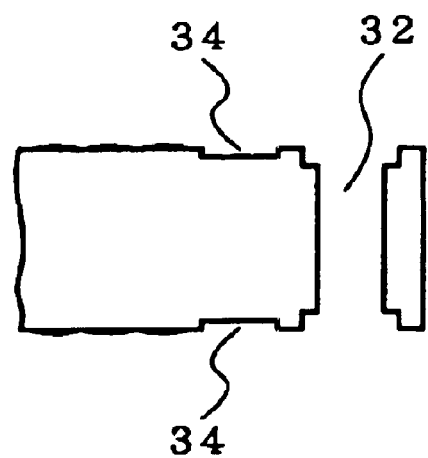
FIG. 8
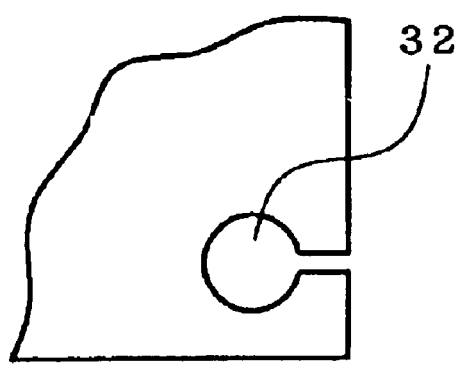  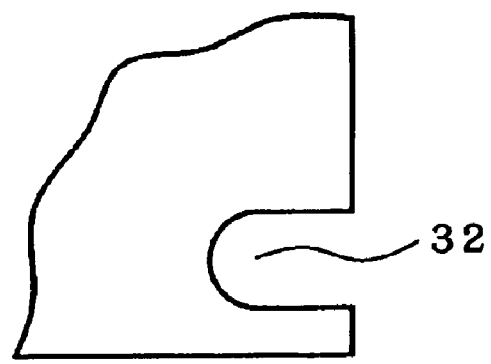
FIG. 9A                FIG. 9B

F I G. 1 1 A
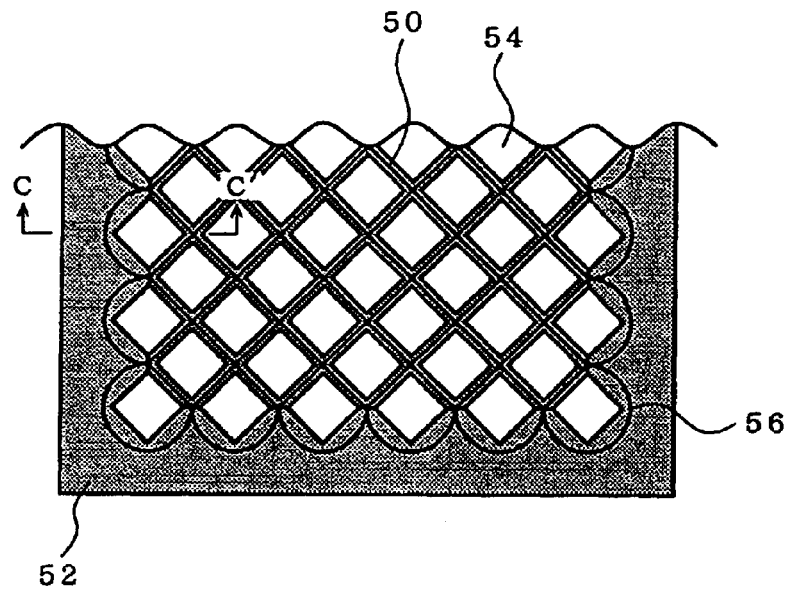
F I G. 1 1 B
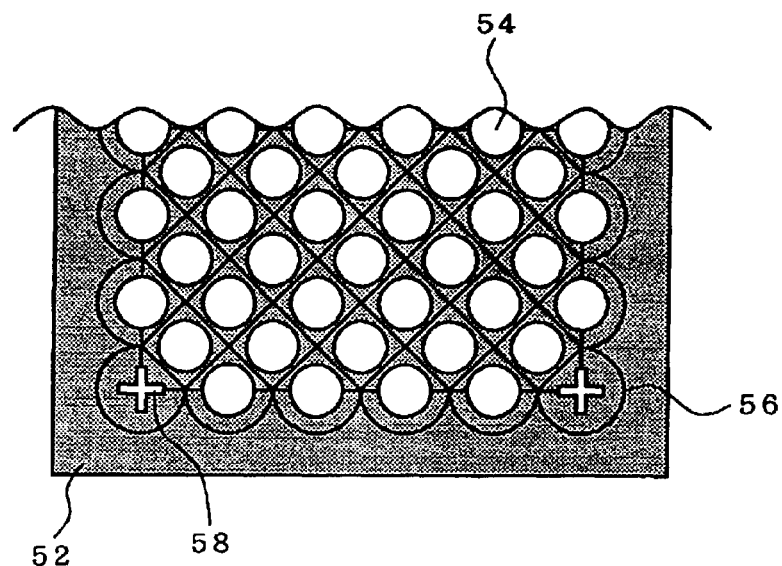

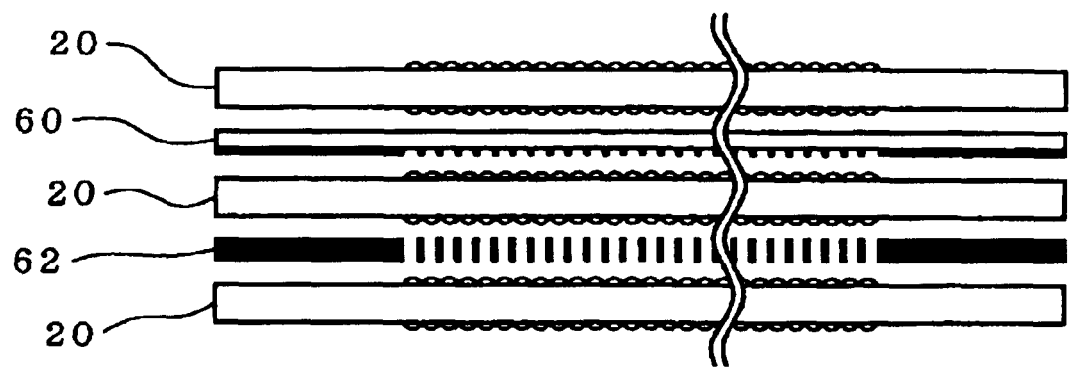
F I G . 1 4
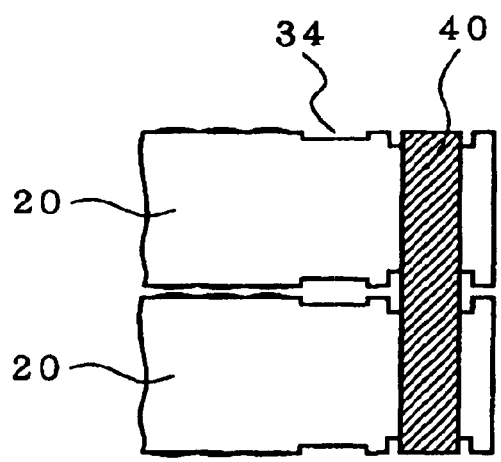
F I G . 1 5

RESIN ERECTING LENS ARRAY AND METHOD FOR FABRICATING THE SAME

FIELD OF THE INVENTION

The present invention relates to a resin erecting lens array that comprises at least two opposed resin lens plates on which spherical or aspherical micro-lenses are arranged at established intervals. The present invention also relates to a method for fabricating such a resin erecting lens array.

BACKGROUND OF THE INVENTION

Heretofore, methods for fabricating such a kind of resin erecting lens array has been disclosed by the present inventors in Japanese Patent Application Laying-open Nos. 11-245266 (1999) and 200-30306 (2000). That is, these official publications disclose the method for manufacturing a resin lens plate and the method for fabricating a resin erecting lens array.

In FIGS. 1A to 1C, there is illustrated the method for fabricating the resin erecting lens array disclosed in the above publications. Also, in FIG. 2, there is shown a plane view of the resin lens plate.

As shown in these figures, two or more lens plates 10, 12 which are formed by an injection molding can be placed one on top of another as follows. At first, as shown in FIG. 1A, protruded portions 16 formed on the end portions of the lens plate are engaged in the respective recessed portions 14 formed on the end portions of the opposite lens plate. Then, as shown in FIG. 2B, clips 18 are fixed up on the lens plates 10, 12 from their sides, respectively, to hold the lens plates 10, 12 together as shown in FIG. 1C.

Alternatively, the lens plates may be held together not only using clips but also using an adhesive depending on the circumstances. That is, the adhesive is poured into the recessed portion 14 and then the protruded portion 16 is placed in the recessed portion 14 filled with the adhesive. Then, alignment is checked to make sure they are in proper relative position. If they are properly arranged, then a pressure is applied on the layers along the direction of fitting the protruded portion into the recessed portion such that two lens plates 10, 12 are brought into a temporary fixation. Subsequently, clips 18 are fixed up on the lens plates 10, 12 from their sides, respectively, to hold the lens plates 10, 12 together.

In the conventional method for fabricating the resin erecting lens array, however, there is a need to provide a substantially large area on the fringe of the lens plate for each clip 18 to be used for holding the plates together, while micro-lenses cannot be arranged on such an area. Therefore, there is a problem in that the whole size of a device becomes large. In addition, there is another problem that the lens plates go out of alignment by vibrations.

For solving such problems, there is an idea of using only an adhesive but not clips to hold the lens plates together. In this case, however, an additional problem may be arisen with respect to an adhesive strength between the flat resin surfaces. Moreover, if the adhesion area is made small, the adhesive strength between the lens plates decrease. Therefore, there is caused a further problem where the reliability of the resin erecting lens array decreases.

SUMMARY OF THE INVENTION

An object of the present invention is to provide a novel method for fabricating a resin erecting lens array, which includes means of solving the above problems.

Another object of the present invention is to provide a novel resin erecting lens array, which can be fabricated by such a method.

A further object of the present invention is to provide a resin lens plate to be used in the resin erecting lens array.

In the first aspect of the present invention, a method for fabricating a resin erecting lens array constructed of two or more resin lens plates being placed on top of one another, where each of resin lens plate is formed by an injection molding and is provided as a plate on which spherical or aspherical micro-lenses are arranged at established intervals, comprises the steps of: forming an aperture stop for a spherical or aspherical surface of each lens on the surface of the resin lens plate; applying an adhesive on protruded portions and in recessed portions formed on the end portions of the resin lens plate; spreading out the adhesive into the space between the adjacent resin lens plates; aligning an optical axis of each lens of the two or more resin lens plates; and hardening the adhesive.

In the second aspect of the present invention, a method for fabricating a resin erecting lens array constructed of two or more resin lens plates being placed on top of one another, where each of resin lens plate is formed by an injection molding and is provided as a plate on which spherical or aspherical micro-lenses are arranged at established intervals, comprises the steps of: forming an aperture stop for a spherical or aspherical surface of each lens on the surface of the resin lens plate; applying an adhesive on protruded portions and in recessed portions formed on the end portions of the resin lens plate; spreading out the adhesive into the space between the adjacent resin lens plates; aligning an optical axis of each lens of the two or more resin lens plates; hardening the adhesive; and inserting heat-melting resin pins into the pin-insert holes of the resin lens plates, which are formed in the predetermined positions on the end portions of the resin lens plate, and melting at least one end of each resin pin.

In the third aspect of the present invention, a method for fabricating a resin erecting lens array constructed of two or more resin lens plates being placed on top of one another, where each of resin lens plate is formed by an injection molding and is provided as a plate on which spherical or aspherical micro-lenses are arranged at established intervals, comprises the steps of: forming an aperture stop for a spherical or aspherical surface of each lens on the surface of the resin lens plate; aligning an optical axis of each lens of the two or more resin lens plates; and inserting heat-melting resin pins into the pin-insert holes of the resin lens plates, which are formed in the predetermined positions on the end portions of the resin lens plate, and melting at least one end of each resin pin.

In the fourth aspect of the present invention, a resin lens plate formed by an injection molding, where spherical or aspherical micro-lenses are arranged on a plate at established intervals, comprises: pin-insert holes are formed in end portions through which heat-melting resin pins can be inserted for mechanically securing two or more resin lens plates together, and/or recessed and protruded portions are formed on end portions for increasing the contact area of an adhesive.

In the fifth aspect of the present invention, a resin electing lens array comprises two or more resin lens plates described above which are combined together, where two or more resin lens plates are secured together using an adhesive applied on recessed and protruded portions formed on end portions of each resin lens plate, and/or are secured together using heat-melting resin pins being inserted into pin-insert holes formed at the predetermined positions of end portions of each resin lens plate.

BRIEF DESCRIPTION OF THE DRAWINGS

FIG. 4A is a plane view of the resin lens plate to be used in the method for fabricating a resin erecting lens array in accordance with the present invention;

FIG. 4B is an elongated side view of the resin lens plate shown in FIG. 4A;

FIG. 6 is an enlarged cross sectional diagram along the line A-A' in FIG. 4A;

FIG. 7 is an enlarged view of a part of the end portions of the resin lens plate shown in FIG. 4A;

FIG. 8 is an enlarged cross sectional diagram along the line B-B' in FIG. 7;

FIG. 9A is a schematic diagram of another example of the pin-insert hole formed in the resin lens plate in accordance with the present invention;

FIG. 9B is a schematic diagram of still another example of the pin-insert hole formed in the resin lens plate in accordance with the present invention;

FIG. 11A is a schematic plane view of a part of the light-absorptive film for illustrating an example of aperture stop in accordance with the present invention;

FIG. 11B is a schematic plane view of a part of the light-absorptive film for illustrating another example of aperture stop in accordance with the present invention;

FIG. 14 is a schematic side view of the resin erecting lens array in which the light-blocking film for eliminating stray light is arranged between the resin lens plates, in accordance with the present invention;

FIG. 15 is a schematic side view of a part of the resin lens plates being held by a resin pin, in accordance with the present invention;

DETAILED DESCRIPTION OF THE PREFERRED EMBODIMENTS

Hereinafter, we will describe preferred embodiments of the present invention with reference to the attached drawings.

Figure 1A:
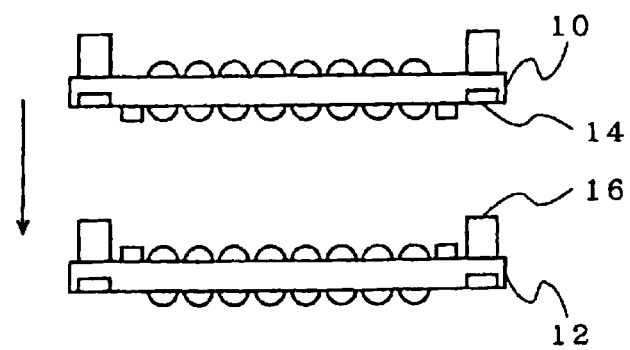
FIG. 1A is a schematic diagram for illustrating the conventional method for fabricating a resin erecting lens array.
Figure 1B:
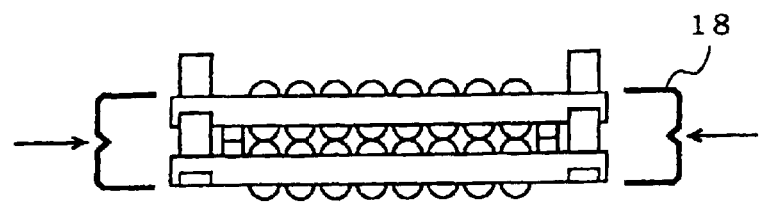
FIG. 1B is a schematic diagram for illustrating the conventional method for fabricating a resin erecting lens array.
Figure 1C:
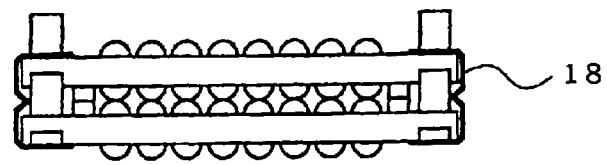
FIG. 1C is a schematic diagram for illustrating the conventional method for fabricating a resin erecting lens array.
Figure 2:
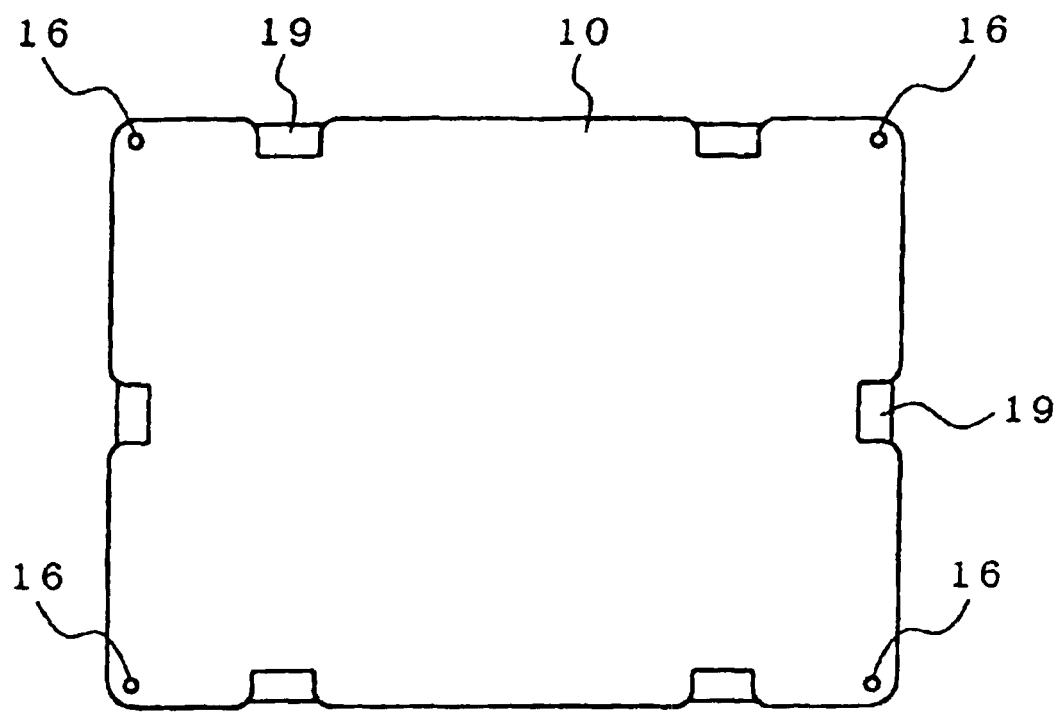
FIG. 2 is a plane view of the resin lens plate to be used in the conventional method illustrated in FIGS. 1A to 1C.
Figure 3:
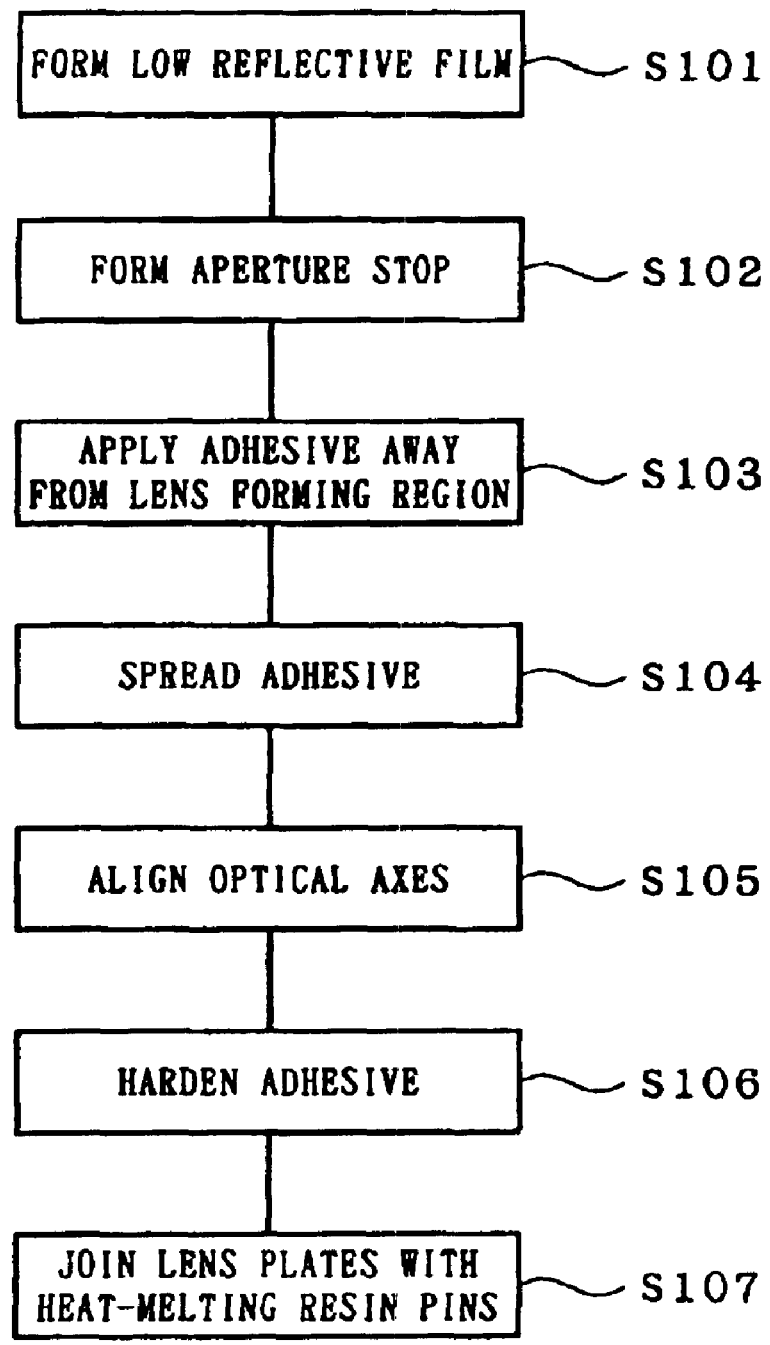
FIG. 3 is a flow chart for illustrating the steps in the method for fabricating a resin erecting lens array in accordance with the present invention.

FIG. 3 is a flow chart for illustrating the steps of a method for fabricating a resin erecting lens in accordance with the present invention.

In the fabrication process, at first, each of lens plates is prepared by an injection molding using a raw material such as an acrylic resin, a cycloolefin resin, or a norbornene system resin, which can be commercially available as ZEONEX (trade name) or ZEONOA (trade name) manufactured by Nippon Zeon Co., Ltd., or ARTON (trade name) manufactured by JSR Co., ltd., characterized by a poor water-absorbing property.

FIG. 4A is a plane view of the resin lens plate prepared by the injection molding, while the FIG. 4B is an elongated side view of the resin lens plate. As shown in the figures, the resin lens plate 20 is in the shape of a square plate having an adhesion regions 22 on its end portions. In addition, the most part of the surface of the resin lens plate 20, except the adhesion regions 22, is a lens-forming region 26 where a plurality of spherical or aspherical micro-lenses are formed.

Figure 5A:
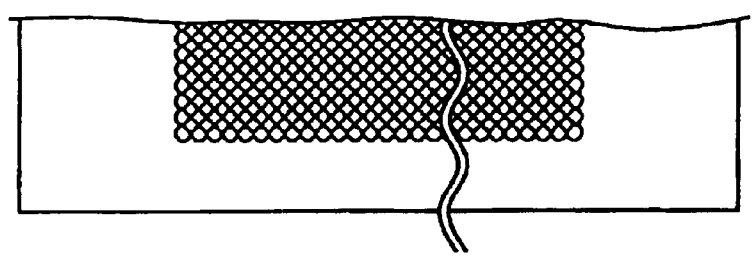
FIG. 5A is a schematic diagram for illustrating an example of the arrangement of micro-lenses on the resin lens plate in accordance with the present invention.
Figure 5B:
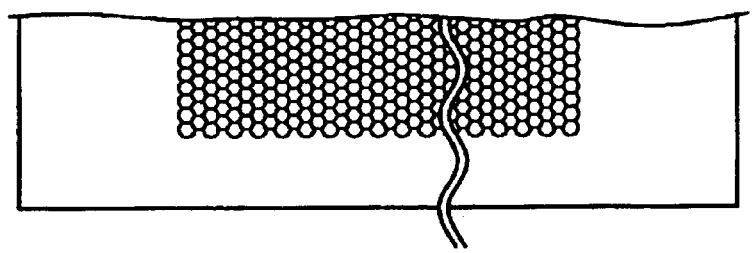
FIG. 5B is a schematic diagram for illustrating another example of the arrangement of micro-lenses on the resin lens plate in accordance with the present invention.
Figure 5C:
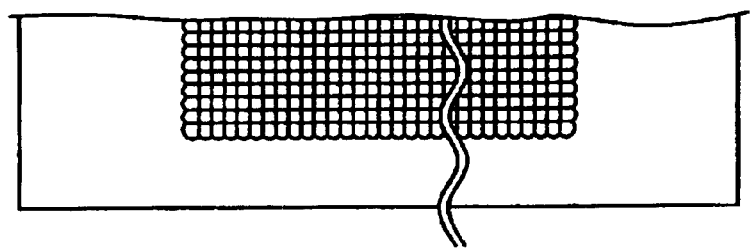
FIG. 5C is a schematic diagram for illustrating still another example of the arrangement of micro-lenses on the resin lens plate in accordance with the present invention.

The arrangement of spherical or aspherical micro-lens 24 is, as shown in FIG. 5A and FIG. 5B, a staggered arrangement in which lenses are placed in rows in a staggered configuration in the direction parallel to the outer edge of the resin lens plate, or a square arrangement in which lenses are placed in a tessellated configuration as shown in FIG. 5C. In addition, as shown in FIG. 5A and FIG. 5C, the lens may be of a tetragonal shape. Alternatively, as shown in FIG. 5B, it may be of a hexagonal shape. In either shape, the lens arrangement can be provided as a close-packed structure. In the case of the tetragonal lens, the outside shape thereof may be selected from parallelograms including a rhombus and a rectangle instead of a square as shown in FIG. 5A and FIG. 5C. In the case of the hexagonal lens, similarly, the outside shape thereof is not limited to orthohexagonal if the opposite sides are in parallel. In either arrangement, by the way, there is no need to be necessary a close-packed structure. Alternatively, the lens arrangements may be a crude-packed structure such that there is a space between the adjacent lenses. In terms of the amount of transmitted light, the close-packed structure is superior than the crude-packed structure.

FIG. 6 is an enlarged cross sectional diagram along the line A-A' in FIG. 4A, FIG. 7 is an enlarged view of the corner of the edge portion of the resin lens plate shown in FIG. 4A, and FIG. 8 is an enlarged cross sectional diagram along the line B-B' in FIG. 7, respectively. For reference, FIG. 7 is provided as a dimensioned figure in units of "millimeter (mm)".

As shown in FIGS. 6 and 7, recessed and protruded portions 30 are formed on the adhesion regions 22 and are effective to extend the contact area of an adhesive. In addition, the height of the protrusions in the recessed and protruded portions 30 should be lower than the height of the micro-lens 24. Also, the side wall of the recessed portion is slanted to become upwardly opened from the bottom to the top.

As shown in FIG. 7 and FIG. 8, the corner of the resin lens plate 20 has a pin-insert hole 32 through which a resin pin can be inserted. Also, an air-passage portion 34 is formed near the pin-insert hole 32 and is provided as a groove extending from the les-forming region to the side edge. The air-passage portion 34 is responsible for keeping the pressure in the opposite lens-forming regions at the atmospheric pressure when the resin erecting lens array is constructed of two or more resin lens plates.

In the example shown in FIG. 7 and FIG. 8, furthermore, the pin-insert hole is completely separated from the edge of the resin lens plate. However, it is not limited to such a configuration. Alternatively, as shown in FIG. 9A, it may be a hole extending to the edge of the resin lens plate. Alternatively, as shown in FIG. 9B, it may be a recessed portion formed in the edge of the resin lens plate. In either type, the resin pin can be inserted. In this specification, therefore, each of them is commonly described as a pin-insert hole.

Figure 10A:
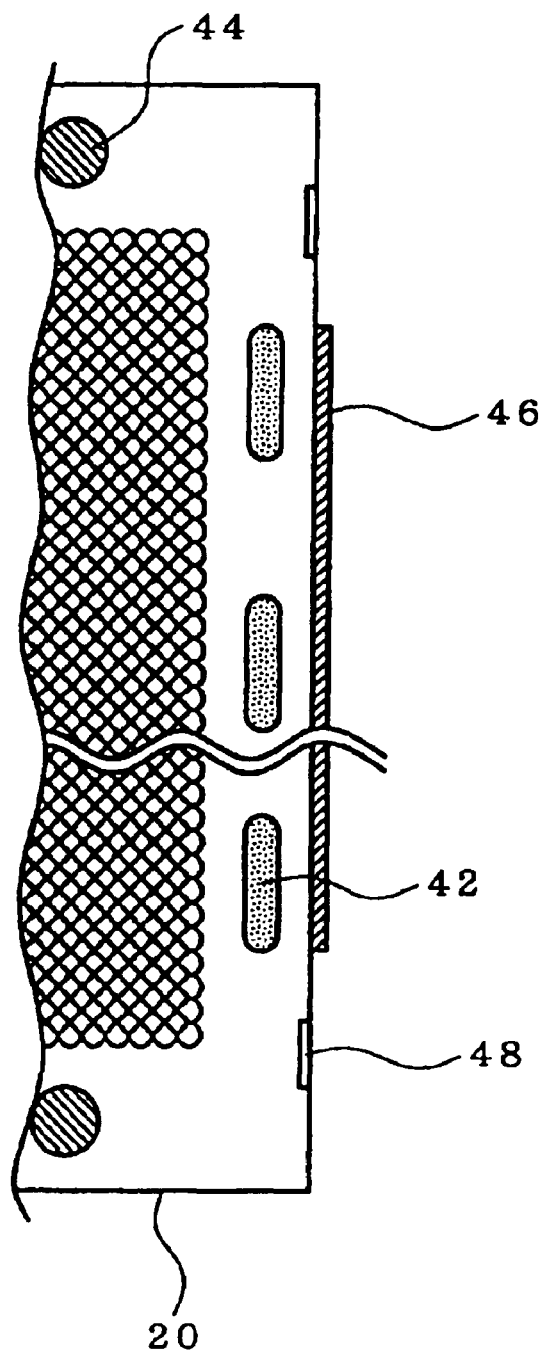
FIG. 10A is a plane view of a part of the end portions of the resin lens plate in accordance with the present invention.
Figure 10B:
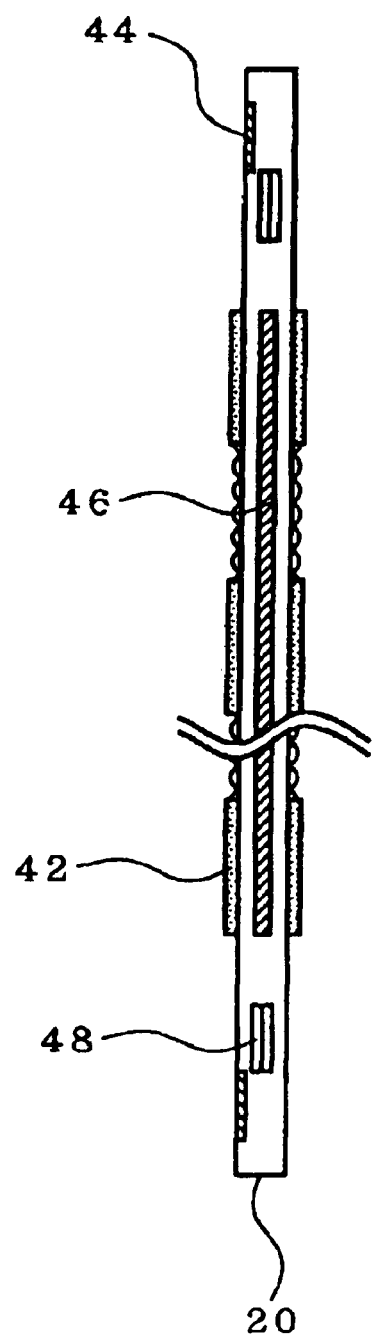
FIG. 10B is a side view of the resin lens plate shown in FIG. 10A.

FIG. 10A is a plane view of a part of the end portions of the resin lens plate, while FIG. 10B is a side view of the resin lens plate shown in FIG. 10A. Here, for easily understandable, the adhesion region 22 and the pin-insert hole 32 are omitted.

In the outside of the lens-forming region, an adjustment part 42 for keeping the spacing between the tops of the opposite micro-lenses constant. Two or more adjustment part 42 may be provided if required.

In the outside of the lens-forming region, furthermore, there are pin marks 44 caused by ejector pins of an injection molding machine. That is, these pin marks 44 are impressions formed by the ejection pins for facilitating the removal of a molded body from a die at the time of an injection molding.

Furthermore, there is a gate mark 46 on the side surface (the surface on which lenses are not formed) of the resin lens plate 20. The gate mark 46 is a mark corresponding to a film gate for injecting an injection-molding resin into the die. In the case of a molded body in the shape of a thin plate, a broadened film gate is formed in the side of the die and then the resin is introduced into the die for injection molding. In this case, a molding shrinkage is evenly occurred, so that the molded body can be less deformable under the shrinkage and residual stresses that cause deformation in the molded body become lowered.

These pin marks 44 and the gate mark 46 can be used as means for adjusting the resin lens plates 20 so that they are in their proper relative positions when they are placed one on top of another in the same molding direction at the time of constructing a resin erecting lens array by stacking them on top of each other in layers.

Moreover, there are under cut portions 48 in the side surface of the resin lens plate 20. The engagement between the under cut portion 48 and the corresponding protruded portion formed on an outer housing makes easy to mount the resin lens plate into the outer housing.

Referring again to FIG. 3, we will describe each step of the method for fabricating an resin erecting lens array using the resin lens plates configured as described above.

1. A low reflective film is formed on the surface of the molded resin lens plate (S101). The low reflective film is provided for reducing the reflectivity of the resin lens plate and is made of a material having a refractive index lower than that of the resin lens plate. Therefore, such a film may be a silicon dioxide film or a fluorine-contained resin film. In the case of the resin film, the same ingredient may be also included in the composition of the resin lens plate. For improving the adhesion between the film and the plate, the presence of such a common ingredient is preferable. As will be described later, the low reflective film may be formed on the uppermost layer of the resin lens plate. In this case, this step can be omitted.

2. An aperture stop is formed for a spherical or aspherical surface of each micro-lens on the surface of the resin lens plate. The aperture stop is effective to remove stray light and is prepared by forming an light-absorptive film on the boundary between the adjacent micro-lenses while leaving openings concentric with the lenses intact.

FIG. 11A is a schematic plane view of a part of the light-absorptive film for illustrating an example of the aperture stop. As shown in the figure, the light-absorptive film 52 is formed on the resin lens plate. In addition, a plurality of openings 54 is formed within the region with a predetermined width such that these openings 54 are arranged along bisectors that respectively bisect line segments connecting between the centers of the adjacent lenses. In this case, it is preferable that grooves or protrusions are formed along the bisectors 50 and the light-absorptive film 52 is then formed thereon. The groove or protrusion acts as a partition wall between the adjacent lenses, so that the passage of a part of light rays inclined with respect to the optical axis of the lens can be blocked. In addition, the light-absorptive film 52 is also formed on a region out of the lens-forming region, where light rays transmit which do not contribute to an image formation of the image surface. In the figure, the reference numeral 56 denotes the outline of the lens.

FIG. 11B is a schematic plane view of a part of the light-absorptive film for illustrating an another example of the aperture stop. In this case, a light-absorptive film 52 is formed on a region except openings 54 concentric with the respective lenses. As shown in the figure, markers 58 may be provided on the surface of the resin lens plate 20 for the alignment in the formation of the light-absorptive film. In the figure, the marker 48 is in the shape of a cross. However, it is not limited to such a shape. Any shape, such as a square, may be allowable.

Figure 12A:
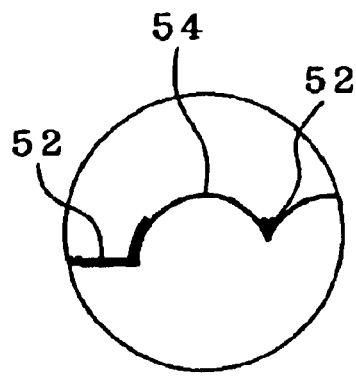
FIG. 12A is a cross sectional diagram along the line C-C' in FIG. 11A.
Figure 12B:
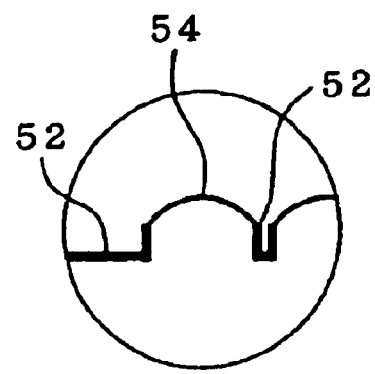
FIG. 12B is a cross sectional diagram just as in the case with FIG. 12A except that a groove is formed in the lens plate and extends along a bisector and the light-absorptive film is then formed on the surface of the groove.

FIG. 12A is a cross sectional view along the line C-C' in FIG. 11A. As shown in FIG. 12A, a light-absorptive film 52 is formed on the boundary region between the adjacent lenses and the outside of the lens-forming region while leaving the openings 54 intact. Also, FIG. 12B illustrates that the light-absorbing film 52 is applied on the grooves along the bisectors formed on the resin lens plate.

It is preferable to make a rough or slightly irregular surface on the region where light rays transmit that do not contribute to the image formation on the image surface for the purpose of reducing undesired reflections when the light-absorptive film is formed.

If the low reflective film formed on the surface of the resin lens plate is made of a fluorine-contained resin, it is preferable that a light-absorptive layer to be formed on the low reflective film is also made of a fluorine-contained material. In addition, it is also preferable that an adhesive to be used for the adhesion between end portions of the opposite resin lens plates is made a fluorine-contained material because of improving the adherence. For cementing the resin lens plate together using a silicon- or epoxy-based adhesive which is generally used for the adhesion of glass plates, a hydrophilic film may be formed on the surface of the resin lens plate to be coated with the adhesive. The hydrophilic film is effective to improve a wettability to the adhesive, so that it should be exposed on the surface of the resin lens plate. For this reason, the hydrophilic film may be formed on the uppermost after forming the light-absorptive film and the low-reflective film. Here, the hydrophilic film may be a silicon dioxide film or the like. As described above, the silicon dioxide film can be also provided as a low reflective film. Thus, when the silicon dioxide film is applied as a base coat, it may be exposed by removing a part of the light-absorptive layer (i.e., the upper layer) corresponding to the opening for the lens and simultaneously removing another part of the light-absorptive layer corresponding to the adhesive coated portion. In this case, therefore, there is no need to form an additional hydrophilic film as the uppermost layer.

In addition, a fluorine-contained resin as a low reflective film may be formed as an outer layer of the light-absorptive film. In this case, a fluorine-contained resin should be used as a raw material of both the light-absorptive film and the adhesive.

3. An adhesive is applied on a portion out of the lens-forming region and having a height equal to or less than the height of the lens (S103).

The adhesive is applied on an adhesive region 22. The adhesive region 22 is a part of the edge portion of the resin lens plate and is equal to or lower than the height of the lens.

A raw material of the adhesive to be used for cementing the resin lens plate together may preferably contain a part of the composition of the uppermost film of the resin lens plate. In this case, however, a typical acrylic- or epoxy-based adhesive is used when the adherence is improved by the formation of a hydrophilic film as the uppermost layer of the resin lens plate. The adhesive to be used is one having the property of shrinkage on curing for holding the contact between the tops or neighborhood thereof of the opposite lenses at the time of cementing two opposite resin lens plates. In addition, a photo-curing type adhesive may be used because a heat-curing type adhesive will cause the displacements of the resin lens plates as a result of deformation at the time of fixation after alignment.

4. The adhesive is spread out into the spaces formed in two or more resin lens plates (S104).

Figure 13A:
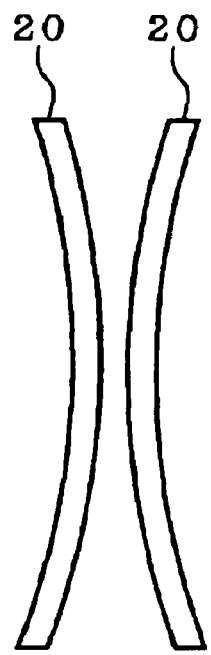
FIG. 13A is a schematic diagram for illustrating resin les plates placed one upon another, which are being warped in the opposite directions, in accordance with the present invention.
Figure 13B:
FIG. 13B is a schematic diagram for illustrating resin les plates placed one upon another, which are being warped in the same direction, in accordance with the present invention.

In the case of an injection molding, if the resin lens plates are molded in the same molding directions (i.e., the direction of die fixation, the direction of die movement, and the direction of gate), each of the resin lens plates can be warped inwardly or outwardly. Therefore, when two or more lens plates are placed on top of one another, the adjacent resin lens plates can be placed one on top of the other as shown in FIG. 13A and FIG. 13B. In this case, the adjacent resin lens plates should be placed on top of one another so as to satisfy that the difference between the warped shapes of the opposite surfaces of these plates is small almost at the center of the resin lens plate, compared with other portions, because it is not appropriate to form a space between the lens plates being placed on each other.

Furthermore, if three or more resin lens plates are placed on top of one another, it is preferable that the lens plate to be posited in the middle is not warped. If the middle lens plate is not warped, the above relationship between the adjacent lens layers can be applicable to outer lens plates.

Moreover, at the time of placing the lens plates one on top of the other, the air between the lens plates can be escaped by passing through the air passage portion 34.

A light-blocking film for removing stray light may be sandwiched between the resin lens plates at the time of placing the plates one on top of the other. In this case, openings corresponding to the lens arrangement are formed or printed on the light-blocking film.

FIG. 14 is a schematic side view of the resin erecting lens array comprising three resin lens plates, in which different light-blocking films for eliminating stray light are arranged between the different sets of adjacent resin lens plates, respectively. As shown in the figure, a light-blocking film 60 is one having a high optical transmittance, on which a printing is performed with a light-absorptive material such that openings almost corresponding to the lens arrangement are formed on the surface of the film. Another light-blocking film 62 is one having a low optical transmittance, in which openings almost corresponding to the lens arrangement are formed.

In FIG. 14, different types of the light-blocking films 60, 62 are sandwiched between the resin lens plates, respectively. Alternatively, the same type of the light-blocking films may be sandwiched between the resin lens plates, respectively. In addition, there is no need to insert the light-blocking films into all of the pairs of adjacent resin lens plates. At least one of them may have a light-blocking film.

In addition, for aligning the openings of the light-blocking film with the micro-lenses, it is preferable that a marker or a protrusion for alignment is formed on the surface of the resin lens plate.

Furthermore, it is preferable that the thermal expansion coefficient of the light-blocking film is substantially equal to that of the resin lens plate. If there is a difference between them, the difference in thermal shrinkage will be caused between the light-blocking film and the resin lens plate by temperature variations, resulting in displacements between the openings of the light-blocking film and the lenses. Furthermore, if the openings of the light-blocking film are formed by punching, the displacements lead to the movement of the light-blocking portion of the film into the space between the convex portions of the lenses. Therefore, there is a possibility of variations in the distance between the convex portions of the opposite lenses.

5. An optical axis of each of micro-lenses on two or more resin lens plates is aligned (S105).

6. The adhesive is hardened (S106).

The hardening is performed by irradiation with light.

7. Heat-melting resin pins are inserted into the pin-insert holes of the resin lens plates and at least one end of each resin pin is melted to held the resin lens plates together (S107).

As shown in FIG. 15, resin pin 40 is inserted through the pin insert holes (about 0.9 mm in diameter) of two resin lens plates being placed one on top of the other. After rough alignment, both ends of the resin pin is melted and cooled to mechanically fix the resin lens plates together. Such an adhesion fixation may be performed using a heating tool such as a soldering iron to locally heat the resin pin, immediately followed by blowing air so as to be rapidly cooled.

The resin pins are used for the reinforcements after cementing the lens plates together. In addition, the resin pins may be also used as a guide member for placing two or more lens plates on top of one on another. That is, the resin pin is inserted through the pin insert hole formed in the edge portion of one of the resin lens plate and is then used as a guide member to place another resin plate on it.

In this invention, the recessed and protruded portions 30 are formed on the adhesion regions 22, so that the adhesion areas of cementing the resin lens plates together using the adhesive can be larger than the adhesion area to be obtained by cementing the flat surfaces together. Furthermore, the recessed portion can be filled with the adhesive, so that the strength in the direction parallel to the surface of the lens plate can be improved.

Therefore, if a sufficient adhesive force can be acquired by the application of an adhesive on each of the adhesive regions having the recessed and protruded portions, there is no need to the reinforcements using the resin pins.

In addition, if it is possible to mechanically fix the lens plates using only resin pins without using any adhesive, these lens plates may be secured together using only the resin pins.

A partition structure may be provided on the resin erecting lens array fabricated by the above method. The partition structure is formed in parallel to the optical axis of the lens and is provided as a partition to distinguish the imaging spaces of the adjacent lenses to eliminate stray light.

Figure 16A:
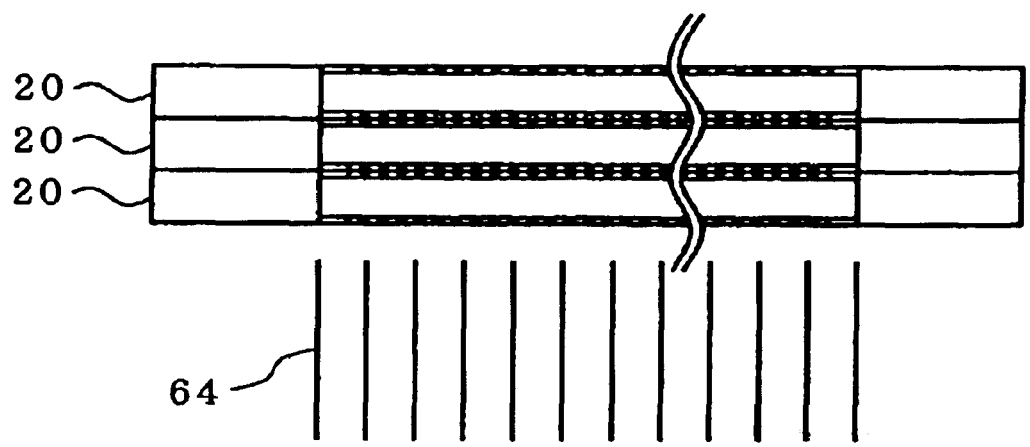
FIG. 16A is a schematic diagram for illustrating that a partition structure is arranged on the incident side of the resin erecting lens array, in accordance with the present invention.
Figure 16B:
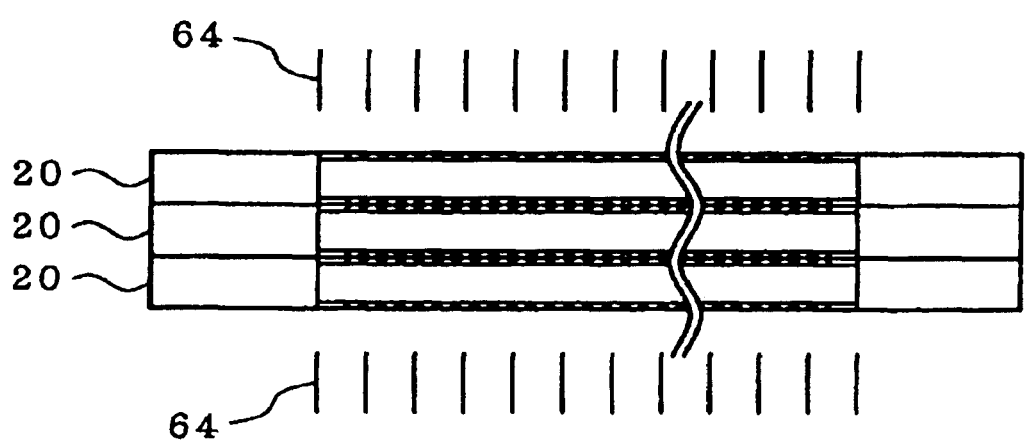
FIG. 16B is a schematic diagram for illustrating that partition structures are arranged on both the incident side and the output side of the resin erecting lens, in accordance with the present invention.

FIG. 16A is a schematic diagram for illustrating that a partition structure 64 is arranged on the incident side of the resin erecting lens array, while FIG. 16B is a schematic diagram for illustrating that partition structures 64 are arranged on both the incident side and the output side of the resin erecting lens, in accordance with the present invention.

The partition structure 64 is made of an aluminum sheet coated with a light-absorbent film or treated with a an antireflective coating and is provided with a honeycomb or lattice pattern.

Furthermore, the resin erecting lens array can be secured in the housing by engaging the undercut portion formed around the side portions of the resin lens plate with protruded portions formed on the housing.

What is claimed is:

1. A method for fabricating a resin erecting lens array constructed of two or more resin lens plates being placed on top of one another, wherein each of resin lens plate is formed by an injection molding and is provided as a plate on which spherical or aspherical micro-lenses are arranged at established intervals, comprising the steps of:

forming an aperture stop for a spherical or aspherical surface of each lens on the surface of the resin lens plate;

applying an adhesive on protruded portions and in recessed portions on the end portions of the resin lens plate;

spreading out the adhesive into the space between the adjacent resin lens plates;

aligning an optical axis of each lens of the two or more resin lens plates; and hardening the adhesive.

2. A method for fabricating a resin erecting lens array as claimed in claim 1, comprising a further step of:

forming a hydrophilic film on at least an adhesive-applied portion on the surface of the resin lens plate before or after the step of forming the aperture stop for a spherical or aspherical surface of each lens on the surface of the resin lens plate.

3. A method for fabricating a resin erecting lens array constructed of two or more resin lens plates being placed on top of one another, where each of the resin lens plate is formed by an injection molding and is provided as a plate on which spherical or aspherical micro-lenses are arranged at established intervals, comprising the steps of:

forming an aperture stop for a spherical or aspherical surface of each lens on the surface of the resin lens plate;

applying an adhesive on protruded portions and in recessed portions formed on the end portions of the resin lens plate;

spreading out the adhesive into the space between the adjacent resin lens plates;

aligning an optical axis of each lens of the two or more resin lens plates;

hardening the adhesive; and inserting heat-melting resin pins into the pin-insert holes of the resin lens plates, which are formed In the predetermined positions on the end portions of the resin lens plate, and melting at least one end of each resin pin.

4. A method of fabricating a resin erecting lens array as claimed in claim 3, comprising a further step of:

forming a hydrophilic film on at least an adhesive-applied portion on the surface of ht resin lens plate before or after the step of forming the aperture stop for a spherical or aspherical surface of each lens on the surface of the resin lens plate.

5. A method for fabricating a resin erecting lens array constructed of two or more resin lens plates being placed on top of one another, where each resin lens plate is formed by an injection molding and is provided as a plate on which spherical or aspherical micro-lenses are arranged at established intervals, comprising the steps of:

forming an aperture stop for a spherical or aspherical surface of each lens on the surface of the resin lens plate;

aligning an optical axis of each lens of the two or more resin lens plates; and inserting heat-melting resin pins into the pin-insert holes of the resin lens plates, which are formed in the predetermined positions of the end portions of the resin lens plate, and melting at least one end of each resin pin.

6. A method for fabricating a resin erecting lens array as claimed in one of claims 1–4, wherein a photo-curing adhesive is used as the adhesive to minimize displacements of the resin lens plates to be caused by deformations In the resin lens plates before or after the adhesion.

7. A method for fabricating a resin erecting lens array as claimed in one of claims 1 to 5, comprising a further step of:

forming a low reflective film on at least a part of the surface of the resin lens plate before or after the step of forming the aperture stop for a spherical or aspherical surface of each lens on the surface of the resin lens plate.

8. A method for fabricating a resin erecting lens array as claimed in one of claims 1 to 5, comprising a further step of:

sandwiching a light-blocking film in which openings are formed at the positions corresponding to arrangement of lenses or a light-blocking film on which openings are printed at the positions corresponding to the arrangement of lenses between at least a pair of the resin lens plates at the time of placing two or more resin lens plates on top of one another.

9. A method for fabricating a resin erecting lens array constructed of two or more resin lens plates being placed on top of one another, where each of resin lens plate is formed by an injection molding and is provided as a plate on which spherical or aspherical micro-lenses are arranged at established intervals, comprising the steps of:

inserting heat-melting resin pins into the pin-insert holes formed on the end portions of one of the resin lens plates at the time of placing two or more resin lens plates on top of one another; and placing another resin lens plate on the resin lens plate using the resin pins as guide members.

10. A method for fabricating a resin erecting lens array constructed of two or more resin lens plates being placed on top of one another, where each of resin lens plate is formed by an injection molding and is provided as a plate on which spherical or aspherical micro-lenses are arranged at established intervals, comprising the steps of:

inserting heat-melting resin pins into the pin-insert holes formed at the predetermined positions of the end portions of each of the resin lens plates at the time of placing two or more resin lens plates on top of one another; and melting at least one end of each of the resin pins, followed by application of pressure on both ends of each of the resin pins to mechanically hold the reins lens plates together.

11. A method for fabricating a resin erecting lens array as claimed in claim 1, 3, 5, 9 or 10, wherein the adjacent resin lens plates are placed on top of one another in such a manner that differences between warped shapes of the opposite surfaces of the adjacent resin lens plates are small proximate to the center of each of the adjacent resin lens plates, compared with other portions.

12. A method for fabricating a resin erecting lens array as claimed in claim 1, 3, 5, 9 or 10, wherein the resin lens plates are placed on top of one another by performing directional alignment using pin marks which are one of impressions caused by ejector pins which eject a molded body from a die when an injection molding process is complete, and gate marks which are impressions of the gate for injecting an injections molding resin into the die at the time of placing two or more resin lens plates on top of one another.

13. A resin plate formed by an injection molding, where spherical or aspherical micro-lenses are arranged on a plate at established intervals, wherein pin-insert holes are formed in end portions through which heat-melting resin pins can be inserted for mechanically securing two or more resin lens plates together.

14. A resin plate formed by an injection molding, where spherical or aspherical micro-lenses are arranged on a plate at established intervals, wherein recessed and protruded portions are formed on end portions for increasing the contact area of an adhesive and, wherein the height of the protrusion in each of the recessed and protruded portions is lower than the height of the micro-lens.

15. A resin lens plate as claimed in claim 13 or 14, wherein an aperture stop is formed for a spherical or aspherical surface of each micro-lens.

16. A resin lens plate as claimed in claim 13 or 14, wherein a low reflective film is formed on the surface of the resin lens plate, and an aperture stop is formed in the low reflective film for a spherical or aspherical surface of each micro-lens.

17. A resin lens plate as claimed claim 13 or 14, wherein a hydrophilic film is formed on at least a part of the surface of the uppermost layer.

18. A resin erecting lens array, wherein two or more resin lens plates of one of claim 13 or 14 are combined together.

19. A resin erecting lens array as claimed in claim 18, wherein an aperture stop is formed for a spherical or aspherical surface of each micro-lens on at least one surface of the resin lens plate.

20. A resin erecting lens array as claimed in claim 18, wherein a light-blocking film in which openings are formed at the positions corresponding to the arrangement of lenses or a light-blocking film on which openings are printed at the positions corresponding to the arrangement of lenses is sandwiched between at least one pair of resin lens plates.

21. A resin erecting lens array as claimed in claim 18, wherein two or more resin lens plates are secured together using an adhesive applied on recessed and protruded portions formed on end portions of each resin lens plate.

22. A resin erecting lens array as claimed in claim 18, wherein two or more resin lens plates are secured together using heat-melting resin pins being inserted into pin-insert holes formed at the predetermined positions of end portions of each resin lens plate.

23. A resin erecting lens array as claimed in claim 18, wherein two or more resin lens plates are secured together using an adhesive applied on recessed and protruded portions formed on end portions of each resin lens plate and using heat-melting resin pins being inserted into pin-insert holes formed at the predetermined positions of end portions of each resin lens plate.

24. A resin lens plate formed by an injection molding as claimed in claim 13 or 14, further comprising:

a groove extending from a lens-forming region to a side of the resin lens plate is formed for keeping the pressure In the opposite lens-forming regions at the atmospheric pressure at the time of constructing a resin erecting lens array by placing two or more resin lens plates on top of one another.

* * * * *

UNITED STATES PATENT AND TRADEMARK OFFICE
CERTIFICATE OF CORRECTION

PATENT NO.         : 6,804,061 B2
APPLICATION NO.    : 10/138112
DATED              : October 12, 2004
INVENTOR(S)        : Hiroyuki Nemoto et al.

It is certified that error appears in the above-identified patent and that said Letters Patent is hereby corrected as shown below:

At column 5, line 17, delete "les-forming" and insert --lens-forming--

At column 11, line 28, delete "reins" and insert --resin--

At column 10, line 19, delete "formed In the" and insert --formed in the--

At column 10, line 26, delete "ht" and insert --the--

At column 10, line 50, delete "In the resin lens plates" and insert --in the resin lens plates--

At column 12, line 53, delete "In the opposite" and insert --in the opposite--

Signed and Sealed this

Twenty-fourth Day of April, 2007

JON W. DUDAS
*Director of the United States Patent and Trademark Office*